United States Patent [19]

Clark et al.

[11] 4,348,330
[45] Sep. 7, 1982

[54] PROCESS FOR THE PRODUCTION OF SULPHINATES OF BENZHYDROL COMPOUNDS

[75] Inventors: Malcolm C. Clark, Cheadle; John B. Henshall, Manchester, both of England

[73] Assignee: Ciba-Geigy Corporation, Ardsley, N.Y.

[21] Appl. No.: 232,084

[22] Filed: Feb. 6, 1981

[30] Foreign Application Priority Data

Mar. 14, 1980 [GB] United Kingdom ................ 8008768
Oct. 10, 1980 [GB] United Kingdom ................ 8032772

[51] Int. Cl.³ ............................................ C07C 145/00
[52] U.S. Cl. ...................... 260/456 NS; 260/326.55; 260/326.82; 544/111; 544/159; 546/187; 546/191; 546/232; 546/246; 546/247; 546/248
[58] Field of Search ................ 260/456 NS; 546/187, 546/232; 544/111

[56] References Cited

U.S. PATENT DOCUMENTS 2,726,252 12/1955 Balon et al. ........................ 260/391
3,193,404 7/1965 Davis ................................... 117/38
4,210,601 7/1980 Dundon et al. ................ 260/570 D

FOREIGN PATENT DOCUMENTS 5251 11/1979 European Pat. Off.
2173268 10/1973 France.

OTHER PUBLICATIONS

Toshino: Repts. Tokyo Imp. Ind. Research Inst. Lab. 37,95–/89 (1942), English Translation and Chem. Abstr. 42, 5887.

Primary Examiner—Ethel G. Love
Attorney, Agent, or Firm—Edward McC. Roberts

[57] ABSTRACT

A process for the production of a sulphinate of formula

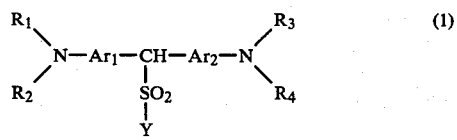

which comprises reacting a compound of formula

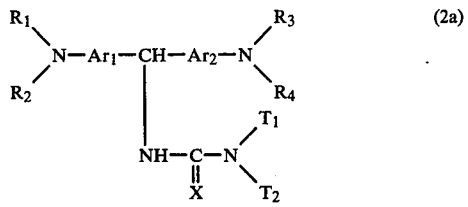

or

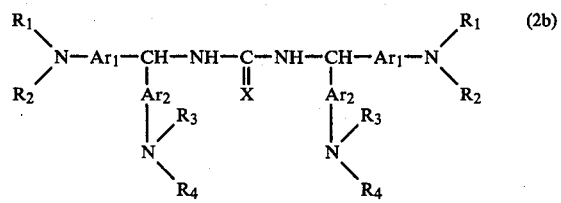

or a mixture of the compounds of formulae (2a) and (2b) with a compound of formula $$Y-SO_2-M \qquad (3)$$

in an organic solvent in the presence of a mineral acid or organic acid and, optionally, also of water, wherein $Ar_1$ and $Ar_2$ are the same or different and each represents an unsubstituted or substituted aromatic carbocyclic radical.

$R_1$, $R_2$, $R_3$ and $R_4$ independently of one another represent hydrogen, $C_1$–$C_{12}$-alkyl, $C_2$–$C_8$-alkoxyalkyl, cycloalkyl, aralkyl, aryl, or substituted alkyl, cycloalkyl, aralkyl or aryl, or each of the pairs of substituents ($R_1$ and $R_2$) and ($R_3$ and $R_4$), together with the nitrogen atom to which said pair is attached, independently, represents a heterocyclic ring, or one of several of the substituents $R_1$, $R_2$, $R_3$ and $R_4$ with the nitrogen and an adajcent carbon atom of the residue $Ar_1$ or $Ar_2$ form a heterocyclic ring, Y represents an unsubstituted or substituted $C_1$–$C_{20}$-alkyl, cycloalkyl, aryl, aralkyl or heterocyclic radical, X represents oxygen, sulphur or imino, $T_1$ and $T_2$ independently represent hydrogen, $C_1$–$C_{12}$-alkyl, $C_2$–$C_{12}$-alkenyl, aryl, aralkyl, and $T_1$ also amido or ureido, or $T_1$ and $T_2$ together with the nitrogen atom which links them represent a five or six-membered heterocyclic radical and M represents hydrogen, ammonium, an alkali metal or an alkali earth metal.

13 Claims, No Drawings

PROCESS FOR THE PRODUCTION OF SULPHINATES OF BENZHYDROL COMPOUNDS

The present invention relates to the production of sulphinates of benzhydrol compounds which are colour formers and may be used in pressure sensitive copying systems.

A method for the preparation of sulphinates of 4,4'-diaminobenzhydrols by reaction of the hydrol with a sulphinic acid has been described (U.S. Pat. No. 3,193,404) in which the hydrol is dissolved in glacial acetic acid to form the intensely coloured acetate. The desired sulphinic acid is added and the reaction product poured into cold water or cold ammonium hydroxide solution to precipitate out the water insoluble sulphinate of the hydrol. The precipitate is collected, washed with water and dried. Before this material can be used satisfactorily in pressure sensitive copying systems it must be purified to remove impurities normally present in the Hydrol. For example, 4,4'-bis (dimethylamino) benzhydrol (Michlers Hydrol), can contain, when prepared by the oxidation route from 4,4'-bis (dimethylamino diphenyl) methane, such impurities as the unchanged methane base, tetramethylbenzidine, the corresponding ketone (Michlers Ketone) and a hydrol ether.

A similar preparation for these sulphinate compounds has been described (European Patent Application No. 0,005,251) in which precipitation of these impurities is eliminated by carrying out the reaction in an organic solvent using an organic carboxylic acid and in the absence of water.

The use of large quantities of organic carboxylic acids can be expensive and the necessity of removing water from the reaction system and reactants is a further complication.

We have now developed a process for the production of such sulphinates which can be carried out in the presence of water, enabling the use of sulphinic acids as an aqueous filter cake, and which produces the sulphinates in sufficient purity to enable them to be used directly in pressure sensitive copying systems.

Accordingly, the present invention provides a process for the production of sulphinates of formula

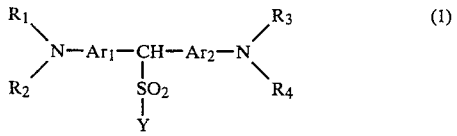

wherein $Ar_1$ and $Ar_2$ may be the same, or different and each represents an unsubstituted or substituted aromatic carbocyclic radical, $R_1$, $R_2$, $R_3$ and $R_4$ independently of one another represent hydrogen, $C_1$–$C_{12}$-alkyl, $C_2$–$C_8$-alkoxyalkyl, cycloalkyl, aralkyl, aryl or substituted alkyl, cycloalkyl, aralkyl or aryl, or each of the pairs of substituents ($R_1$ and $R_2$) and ($R_3$ and $R_4$), together with the nitrogen atom to which said pair is attached, independently, represents a heterocyclic ring, or one or several of the substituents $R_1$, $R_2$, $R_3$ and $R_4$ with the nitrogen and an adjacent carbon atom of the residue $Ar_1$ or $Ar_2$ form a heterocyclic ring, Y represents an unsubstituted or substituted $C_1$–$C_{20}$-alkyl, cycloalkyl, aryl, aralkyl or heterocyclic radical.

The process of the present invention comprises reacting a compound of formula

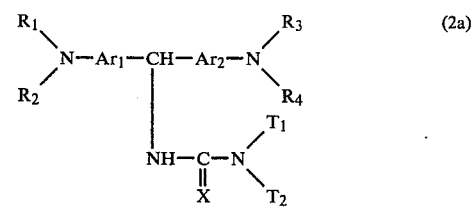

or

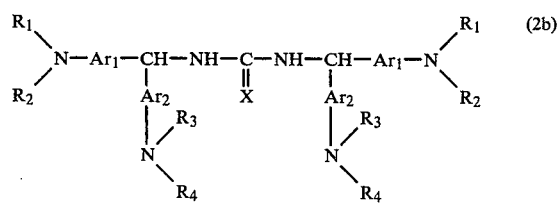

or a mixture of the compounds of formulae (2a) and (2b) with a compound of formula

in an organic solvent in the presence of a mineral acid or organic acid and optionally also of water, wherein $Ar_1$, $Ar_2$, $R_1$, $R_2$, $R_3$, $R_4$ and Y have the given meanings and X represents oxygen, sulphur or imino, $T_1$ and $T_2$ independently represent hydrogen, $C_1$–$C_{12}$-alkyl, $C_2$–$C_{12}$-alkenyl, aryl, aralkyl, and $T_1$ also amido or ureido, or $T_1$ and $T_2$ together with the nitrogen atom which links them represent a five or six-membered, preferably saturated, heterocyclic radical and M represents hydrogen, ammonium, an alkali metal or an alkali earth metal.

The arylene radicals $Ar_1$ and $Ar_2$ preferably represent a 1,4-phenylene or 1,4-naphthalene residue. These divalent residues can be further substituted by halogen, $C_1$–$C_4$-alkyl or $C_1$–$C_4$-alkoxy. As halogen is generally meant fluorine, bromine and especially chlorine.

When each of the radicals $R_1$ to $R_4$, $T_1$, $T_2$ and Y represent alkyl, they may be straight or branched chain alkyl groups such as methyl, ethyl, n-propyl, isopropyl, n-butyl, sec-butyl, octyl or dodecyl. Y may also be hexadecyl, octadecyl or eicosyl.

When each of the radicals $R_1$ to $R_4$ represent alkoxyalkyl, this may have 1 to 4 carbon atoms in each part, but preferably the alkoxyalkyl radical is β-methoxyethyl or β-ethoxyethyl.

When $T_1$ and $T_2$ represent alkenyl, this may be for example allyl, 2-methallyl, 2-ethylallyl, 2-butenyl or octenyl. Examples of cycloalkyl in the meaning of the R and Y radicals are cyclopentyl or, preferably, cyclohexyl, which may be further substituted with 1 to 4 methyl groups.

An aryl radical represented by the R, Y and T radicals can be diphenyl, 1- or 2-naphthyl or, preferably, phenyl. As aralkyl the R, Y and T radicals may be phenyl-$C_1$–$C_4$-alkyl e.g. phenylethyl or, preferably, benzyl.

When $R_1$, $R_2$, $R_3$, $R_4$ and Y represent substituted alkyl, cycloalkyl, aralkyl or aryl, the substituent may be one or more halogen, hydroxy, cyano, alkyl and/or alkoxy groups, the alkyl or alkoxy substituents having 1 to 4 carbon atoms. The phenyl may, for example, be substituted by up to 4 halogens, hydroxy, cyano, nitro, $C_1$–$C_4$-alkyl, $C_1$–$C_4$-alkoxy, $C_2$–$C_4$-alkoxyalkyl, carboxyl, amidocarbonyl, amidosulphonyl, $C_1$–$C_8$-alkylcarbonylamino or benzoylamino groups.

When the pair of substituents ($R_1$ and $R_2$), ($R_3$ and $R_4$), and ($T_1$ and $T_2$), together with the nitrogen atom to which said pair is attached, form a heterocyclic radical, this is for example pyrrolidino, piperidino, pipecolino, morpholino, thiomorpholino, piperazino or N-methylpiperazino.

When one or several of the radicals $R_1$, $R_2$, $R_3$ and $R_4$ with nitrogen and an adjacent carbon atom of the residue $Ar_1$ or $Ar_2$ form a heterocyclic ring they may form, for example, indole, carbazole, julolidine, lilolidine, N-methyltetrahydroquinoline or 1,2-dimethylindoline.

Advantageously, $R_1$, $R_2$, $R_3$ and $R_4$, independently, represent hydrogen, $C_1$–$C_4$-alkyl, $C_2$–$C_4$-alkoxyalkyl, cyclohexyl, benzyl or phenyl, or each of the pairs ($R_1$ and $R_2$) and ($R_3$ and $R_4$), together with the nitrogen atom to which said pair is attached, independently, represents pyrrolidino, piperidino or especially morpholino.

When Y is a heterocyclic residue, it is preferably of aromatic character and may be, for example, quinolin-5-yl, quinolin-6-yl, indazol-7-yl, indol-3-yl or carbazol-3-yl. $T_1$ and $T_2$ are preferably hydrogen.

A compound of formula (2b) is preferably used as starting compound. This has preferably the formula

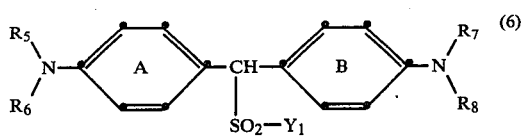
(4)

wherein $R_5$, $R_6$, $R_7$ and $R_8$, independently, represent hydrogen or $C_1$–$C_4$-alkyl and the benzene rings A and B may be further substituted by methyl, ethyl, methoxy, ethoxy, chlorine or bromine and $X_1$ is oxygen or sulphur.

The compound of formula (3) is preferably one of formula $$Y_1\text{—}SO_2M_1 \qquad (5)$$

wherein $Y_1$ is alkyl of 1 to 18 carbon atoms or especially phenyl or phenyl substituted by halogen, nitro, hydroxy, methyl, ethyl, methoxy, ethoxy, carboxy or acetylamino and $M_1$ is hydrogen or alkali metal.

Reaction of a compound of formula (4) with a compound of formula (5) will give a compound of formula

(6)

The process according to the present invention is particularly suitable for the preparation of sulphinates of Michlers Hydrol [4,4′-bis(dimethylamino)benzhydrol].

The organic solvent may be an alcohol, glycol or ketone, such as methanol, ethanol, propanol, acetone or ethylene glycol.

Suitable mineral acids which may be used include hydrochloric acid, sulphuric acid and phosphoric acid. Suitable organic acids include p-toluene sulphonic acid, benzene sulphonic acid, trichloroacetic acid.

The reaction may be carried out at a temperature of from 20° to 100° C., but preferably from 60°–80° C.

The resulting product may be isolated by filtration of the reaction mass. If desired, the reaction mass may be diluted with water and/or neutralised with ammonium hydroxide prior to filtration. The resulting product is sufficiently pure for use in pressure sensitive copying systems without the need for further purification.

The compounds of formulae (2a) and (2b) may be made by various routes, starting from the basic urea derivative of formula

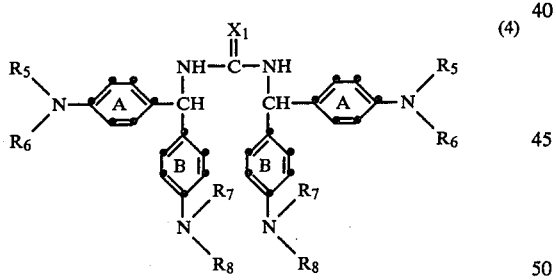
(7)

wherein $T_1$, $T_2$ and X have the given meanings. This compound may be reacted under acidic conditions with one or two molar equivalents of an aldehyde which is $R_1R_2N$—$Ar_1$—CHO or $R_3R_4N$—$Ar_2$—CHO and one or two molar equivalents of compound $R_1R_2N$—$Ar_1$—H or $R_3R_4N$—$Ar_2$—H having an active hydrogen atom. Sufficient acid should be used to protonate the amino groups in the radicals $Ar_1$ and $Ar_2$ in compounds of formulae (2a) and (2b) above.

This reaction may be carried out between ambient temperature and 100° C., optionally in the presence of an organic solvent, such as an alcohol, e.g. methanol or isopropanol.

Suitable acids include hydrochloric, sulphuric, phosphoric, mono-, di- or trichloroacetic, benzenesulphonic or p-toluenesulphonic acid.

For example, p-dimethylaminobenzaldehyde of formula (8) may be reacted with urea and N,N-dimethylaniline in the presence of an acid to form 1,3-bis[(p-dimethylamino-diphenyl)methyl] urea of formula (9) according to the following scheme

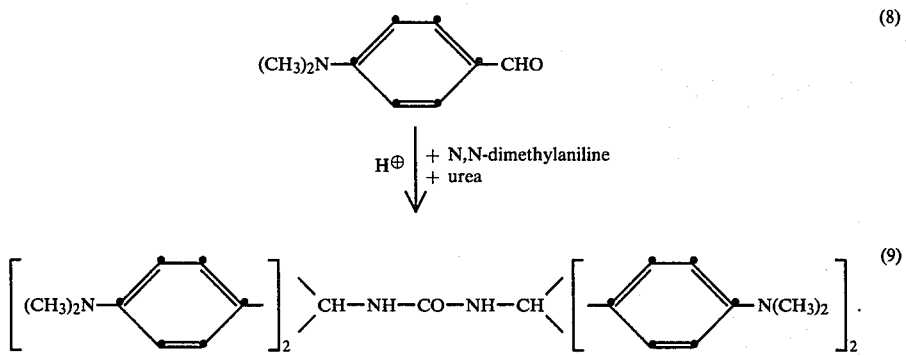

Generally, a mixture of the compound of the formula (9) and of the compound of formula

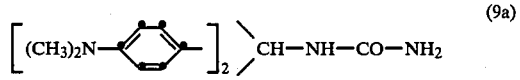

is obtained. The weight ratio of the compound of formula (9) to the compound of formula (9a) is advantageously between 1:9 to 9:1, preferably 1:2 to 2:1.

It is preferred to use an excess of the active hydrogen compound and then remove the excess by filtration or steam distillation before the reaction with the sulphinic acid compound. The urea derivative is obtained in an easily filterable form and need not be recrystallised from an organic solvent.

The benzaldehyde derivatives used in this reaction scheme can be easily prepared by the so-called Vilsmeier-Haack synthesis (Ber. 1927, 60, 119). It is not always necessary to isolate the aldehyde before reacting it with urea and the active hydrogen compound.

Compounds of formula (2b) can also be prepared by reacting the urea compound of formula (7) under acidic conditions, optionally in the presence of an organic solvent such as an alcohol or ketone e.g. methanol, isopropanol or acetone, with a benzhydrol of formula

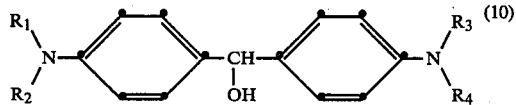

wherein $R_1$, $R_2$, $R_3$ and $R_4$ have the given meanings and the benzene rings may be further substituted by one or more halogen, or alkyl and/or alkoxy each having 1 to 4 carbon atoms.

Sufficient benzhydrol may be used to produce the compound of formula (2b) directly or only enough to react with one $NH_2$-group of the urea may be used. The resulting intermediate may then be reacted with more benzhydrol or with an aldehyde and active hydrogen compound as above to react with the other $NH_2$-group on the urea.

Suitable acids include hydrochloric, sulphuric, phosphoric, formic, mono-, di-, trichloroacetic acid, benzenesulphonic, p-toluene sulphonic or oxalic acid. Mineral acids are preferred on cost grounds.

The resulting compound of formula (2b) is then reacted under acidic conditions with a compound Y—$SO_2H$ or a salt thereof to produce the compounds of formula (1).

Since the compounds of formulae (2a) and (2b) can readily be isolated in crystalline form from the reaction mixture, the resulting compounds of formula (1) can be obtained in a very pure form.

In the examples which follow, the percentages quoted relate to weight, unless otherwise indicated.

EXAMPLE 1

28 g of sodium-p-toluene sulphinate, as an aqueous filter cake, are dissolved in 140 ml methanol by stirring at room temperature, 33.8 g of 1,3-Bis(4',4''-dimethylaminodiphenylmethyl) urea are slurried in 450 ml methanol, 17.6 g 28% hydrochloric acid added followed by the sodium-p-toluene sulphinate solution. The temperature is raised to 70° C. (reflux) and maintained for 2 hours. External cooling is applied and the reaction mass cooled to 20° C. and then filtered. The filter cake is washed with 100 ml methanol and then dried to give 31.6 g of the p-toluene sulphinate of 4,4'-bis (dimethylamino) benzhydrol. Melting point 184°–187° C. This material is suitable for use in copying systems without further purification.

EXAMPLE 2

14 g of sodium p-toluene sulphinate, as an aqueous filter cake, are dissolved in 70 ml methanol by stirring at room temperature, 16.9 g of 1,3-bis(4',4''-dimethylaminodiphenylmethyl) urea are slurried in 225 ml methanol and the temperature is raised to 50° C. with external heating. 11.8 g of p-toluene sulphonic acid is added, followed by the sodium p-toluene sulphinate solution. The temperature is raised to 70° C. (reflux) and maintained for 4 hours. External cooling is applied and the reaction mass cooled to 20° C. and then filtered. The filter cake is washed with 50 ml methanol and then dried to give 22.5 g of the p-toluene sulphinate of 4,4'-bis(dimethylamino)benzhydrol. Melting point 187°–188° C.

EXAMPLE 3

Example 2 is repeated under anhydrous conditions by replacing sodium p-toluene sulphinate aqueous filter cake with dried material.

Yield: 20.5 g. Melting point: 185°–187° C.

EXAMPLE 4

14 g of sodium p-toluene sulphinate, as an aqueous filter cake, are dissolved in 70 ml methanol by stirring at room temperature, 18.72 g of 4,4'-dimethylaminodiphenylmethyl urea are slurried in 250 ml methanol and the temperature is raised to 50° C. with external heating. 8.75 g 28% hydrochloric acid is added followed by the sodium p-toluene sulphinate solution. The temperature is raised to 70° C. (reflux) and maintained 4 hours. External cooling is applied and the reaction mass cooled to 20° C. and then filtered. The filter cake is washed with 50 ml methanol and then dried to give 21.0 g of the p-toluene sulphinate of 4,4'-bis(dimethylamino)benzhydrol.

Melting point: 181°–182° C.

EXAMPLE 5

3.96 g of 1,3-Bis(4',4''-N-morpholinodiphenylmethyl)urea are treated with 2.3 g of dried sodium-p-toluene sulphinate as described in Example 1 to give the p-toluene sulphinate of 4,4'-bis(N-morpholino)benzhydrol.

Yield 3.9 g. Melting point: 140°–143° C.

EXAMPLE 6

2.0 g of 1,3-Bis(4'-dimethylamino-4''-N-benzyl-N-methylaminodiphenylmethyl)ureas are suspended in 50 ml of methanol containing 2 ml of glacial acetic acid. The suspension is heated to 50° C. and 6.0 g of sodium p-toluene sulphinate added in portions over 45 minutes. After stirring for 1 hour the suspension is poured into water, the precipitated product filtered, washed with methanol and dried at 40° C. to give 2.0 g of the p-toluene sulphinate of 4-dimethylamino-4'-N-benzyl-N-methylaminobenzhydrol melting at 190°–191° C.

EXAMPLE 7

8.9 g of 1-(4',4''-dimethylaminodiphenylmethyl)-3-methyl urea are dissolved in 200 ml of methanol containing 4 g 28% hydrochloric acid. A solution of 6.1 g sodium-p-toluene sulphinate in 30 ml methanol is added and the mixture stirred under reflux for 2 hours. After cooling to room temperature the precipitated p-toluene sulphinate of 4,4'-bis(dimethylamino)benzhydrol is filtered off, washed with methanol and dried.

Yield 7.9 g. Melting point 184°–186° C.

EXAMPLE 8

6.0 g of 1,3-Bis(4',4''-dimethylaminodiphenylmethyl)-thiourea are treated with 4.1 g sodium-p-toluene sulphinate in the same manner as described in Example 7, to yield 5.3 g of the p-toluene sulphinate of 4,4'-bis(dimethylamino)benzhydrol.

Melting point 177°–181° C.

EXAMPLE 9

33.8 g of a mixture of 1,3-bis(4',4''-dimethylaminodiphenylmethyl)urea and 1-(4',4''-dimethylaminodiphenylmethyl)urea are slurried in 450 ml methanol. Afterwards 17.6 g 28% hydrochloric acid are added followed by a solution of 28 g of sodium-p-toluene sulphinate (as an aqueous filter cake) dissolved in 140 ml methanol. The temperature is then raised to 70° C. (reflux) and maintained for 2 hours. External cooling is applied and the reaction mass cooled to 20° C. and filtered. The filter cake is washed with 100 ml methanol and then dried to give 31.6 g of p-toluene sulphinate of 4,4'-bis(dimethylamino) benzhydrol.

Melting point 184°–187° C.

What is claimed is:

1. A process for the production of a sulphinate of formula

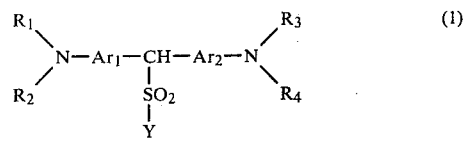

which comprises reacting, in an organic solvent in the presence of a mineral acid or an organic acid, a compound of the formula

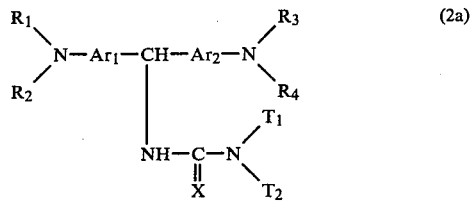

or

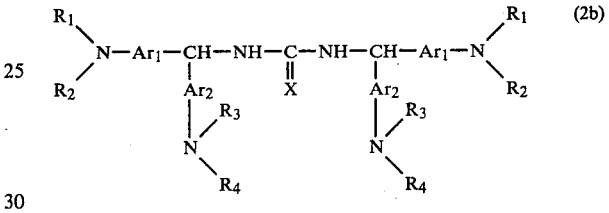

or a mixture of the compounds of formulae (2a) and (2b) with a compound of formula

wherein

Ar$_1$ and Ar$_2$ are the same or different and each represents an unsubstituted or substituted aromatic carbocyclic radical, R$_1$, R$_2$, R$_3$ and R$_4$ independently of one another represent hydrogen, C$_1$–C$_{12}$-alkyl, C$_2$–C$_8$-alkoxyalkyl, cycloalkyl, aralkyl, aryl, or substituted alkyl, cycloalkyl, aralkyl or aryl, or each of the pairs of substituents (R$_1$ and R$_2$) and (R$_3$ and R$_4$), together with the nitrogen atom to which said pair is attached, independently, represents a heterocyclic ring, or one or several of the substituents R$_1$, R$_2$, R$_3$ and R$_4$ with the nitrogen and an adjacent carbon atom of the residue Ar$_1$ or Ar$_2$ form a heterocyclic ring, Y represents an unsubstituted or substituted C$_1$–C$_{20}$-alkyl, cycloalkyl, aryl, aralkyl or heterocyclic radical, X represents oxygen, sulphur or imino, T$_1$ and T$_2$ independently represent hydrogen, C$_1$–C$_{12}$-alkyl, C$_2$–C$_{12}$-alkenyl, aryl, aralkyl, and T$_1$ also amido or ureido, or T$_1$ and T$_2$ together with the nitrogen atom which links them represent a five or six-membered heterocyclic radical and M represent hydrogen, ammonium, an alkali metal or an alkali earth metal.

2. A process according to claim 1, wherein Ar$_1$ and Ar$_2$ represent a 1,4-phenylene or 1,4-naphthalene radical which is unsubstituted or substituted by halogen, C$_1$–C$_4$-alkyl or C$_1$–C$_4$-alkoxy.

3. A process according to claim 1, wherein R$_1$, R$_2$, R$_3$ and R$_4$, independently, represent hydrogen, C$_1$–C$_4$-alkyl, C$_2$–C$_4$-alkoxyalkyl, cyclohexyl, benzyl or phenyl, or each of the pairs ($R_1$ and $R_2$) and ($R_3$ and $R_4$) together with the nitrogen atom to which said pair is attached, independently, represents pyrrolidino, piperidino or morpholino.

4. A process according to claim 1, wherein $R_1$, $R_2$, $R_3$ and $R_4$ are methyl.

5. A process according to claim 1, wherein in formula (2a) $T_1$ and $T_2$ are hydrogen.

6. A process according to claim 1, wherein the compound of formula (2b) has the formula

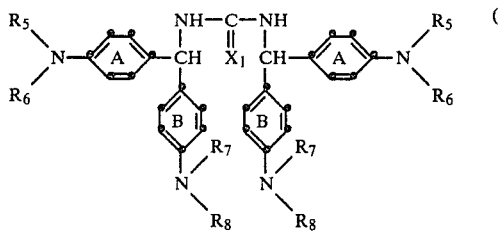

wherein $R_5$, $R_6$, $R_7$ and $R_8$, independently, represent hydrogen or alkyl of 1 to 4 carbon atoms and the benzene rings A and B are unsubstituted or substituted by methyl, ethyl, methoxy, ethoxy, chlorine or bromine and $X_1$ is oxygen or sulphur.

7. A process according to claim 1, wherein a compound of formula (2b) is used.

8. A process according to claim 1, wherein a mixture of the compounds of formulae (2a) and (2b) is used.

9. A process according to claim 8, wherein a mixture of the compound of formula

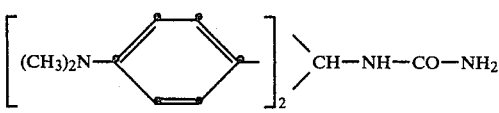

and of the compound of formula

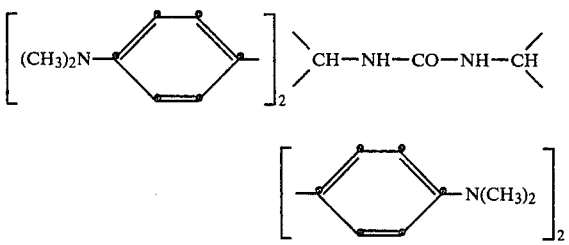

is used.

10. A process according to claim 1, wherein Y is alkyl of 1 to 18 carbon atoms, phenyl, or phenyl substituted by halogen, nitro, hydroxy, methyl, ethyl, methoxy, ethoxy, carboxyl or acetylamino and M is hydrogen or alkali metal.

11. A process according to claim 1, wherein the organic solvent is methanol, ethanol, propanol, acetone or ethylene glycol.

12. A process according to claim 1, wherein the compound of formula (3) is used in the form of an aqueous filter cake and the reaction is carried out in an organic solvent containing water.

13. A process according to claim 1, wherein the reaction is carried out at a temperature of 20° to 100° C.

* * * * *